US012300905B2

(12) United States Patent
Koshi et al.

(10) Patent No.: US 12,300,905 B2
(45) Date of Patent: May 13, 2025

(54) ANTENNA DEVICE

(71) Applicant: Panasonic Intellectual Property Management Co., Ltd., Osaka (JP)

(72) Inventors: Masashi Koshi, Ishikawa (JP); Yoshihiro Kanasaki, Ishikawa (JP); Kazuya Tani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 212 days.

(21) Appl. No.: 17/831,973

(22) Filed: Jun. 3, 2022

(65) Prior Publication Data

US 2022/0302589 A1 Sep. 22, 2022

Related U.S. Application Data

(63) Continuation of application No. PCT/JP2020/045588, filed on Dec. 8, 2020.

(30) Foreign Application Priority Data

Dec. 11, 2019 (JP) ................................ 2019-223946

(51) Int. Cl.
*H01Q 5/364* (2015.01)
*H01Q 7/00* (2006.01)
*H01Q 9/30* (2006.01)

(52) U.S. Cl.
CPC ............... *H01Q 5/364* (2015.01); *H01Q 7/00* (2013.01); *H01Q 9/30* (2013.01)

(58) Field of Classification Search
CPC ............ H01Q 5/364; H01Q 7/00; H01Q 9/30; H01Q 5/385; H01Q 1/2266; H01Q 5/371; H01Q 9/42
See application file for complete search history.

(56) References Cited

U.S. PATENT DOCUMENTS 9,048,528 B1 * 6/2015 Lee ........................ H01Q 5/378
9,077,066 B1 * 7/2015 Lee ...................... H01Q 9/0407
(Continued)

FOREIGN PATENT DOCUMENTS

JP 2005-020621 A 1/2005
JP 2005-150937 A 6/2005
(Continued)

OTHER PUBLICATIONS

International Search Report for corresponding Application No. PCT/JP2020/045588, mailed Feb. 9, 2021.
(Continued)

*Primary Examiner* — Hai V Tran
*Assistant Examiner* — Michael M Bouizza
(74) *Attorney, Agent, or Firm* — Renner, Otto, Boisselle & Sklar, LLP

(57) ABSTRACT

An antenna device includes: a feeding element having a feedpoint that a signal in a first frequency band and a signal in a second frequency band lower than the first frequency band are supplied to; a high-band element connected to the feeding element, the high-band element resonating with the signal in the first frequency band; a low-band element connected to the feeding element, the low-band element resonating with the signal in the second frequency band; an auxiliary element capacitively coupled to the low-band element at an open end of the low-band element; a ground member grounded; and a switch switching a conductive state and a non-conductive state between the ground member and the auxiliary element.

13 Claims, 6 Drawing Sheets

(56) References Cited

U.S. PATENT DOCUMENTS

| | | | | |
|---|---|---|---|---|
| 9,711,858 | B1 * | 7/2017 | Lee | H01Q 9/06 |
| 2005/0099347 | A1 | 5/2005 | Yamaki | |
| 2005/0128162 | A1 | 6/2005 | Takagi et al. | |
| 2007/0188388 | A1 | 8/2007 | Feng et al. | |
| 2008/0129639 | A1 | 6/2008 | Mitsugi | |
| 2012/0127055 | A1 | 5/2012 | Yamagajo | |
| 2012/0146865 | A1 | 6/2012 | Hayashi et al. | |
| 2013/0122828 | A1 | 5/2013 | Choi | |
| 2013/0127677 | A1 * | 5/2013 | Lin | H01Q 1/245 343/722 |
| 2013/0154888 | A1 | 6/2013 | Lin et al. | |
| 2014/0315606 | A1 * | 10/2014 | You | H01Q 9/16 455/575.5 |
| 2016/0218431 | A1 | 7/2016 | Gaddi et al. | |
| 2018/0277951 | A1 | 9/2018 | Nishikawa et al. | |
| 2018/0278287 | A1 | 9/2018 | Nishikawa et al. | |
| 2019/0123441 | A1 * | 4/2019 | Sudo | H01Q 1/243 |

FOREIGN PATENT DOCUMENTS

| | | | |
|---|---|---|---|
| JP | 2005-198245 | A | 7/2005 |
| JP | 2007-166615 | A | 6/2007 |
| JP | 2008-067052 | A | 3/2008 |
| JP | 2012-109875 | A | 6/2012 |
| JP | 2016-536934 | A | 11/2016 |
| WO | 2005/109569 | A1 | 11/2005 |
| WO | 2011/059088 | A1 | 5/2011 |
| WO | 2015042092 | A1 | 3/2015 |
| WO | 2017/141602 | A1 | 8/2017 |

OTHER PUBLICATIONS

The EPC Office Action dated Dec. 5, 2022 for the related European Patent Application No. 20899733.8.

* cited by examiner

ANTENNA DEVICE

BACKGROUND

1. Technical Field

The present disclosure relates to an antenna device.

2. Description of the Related Art

Conventionally, an antenna corresponding to multiple bands is known (see Patent Literature (PTL) 1, for example). The antenna device disclosed in PTL 1 includes a feeding element and a passive element, and switches a resonance frequency of the passive element by connecting or not connecting the passive element to ground. This configuration makes it possible for the antenna device disclosed in PTL 1 to transmit and receive radio waves in a plurality of frequency bands without increasing the size of the antenna element.

PTL 1 is Unexamined Japanese Patent Publication No. 2008-67052.

SUMMARY

The present disclosure provides an antenna device that corresponds to multiple bands and can achieve downsizing and wide band.

An antenna device according to one aspect of the present disclosure includes: a feeding element having a feedpoint that a signal in a first frequency band and a signal in a second frequency band lower than the first frequency band are supplied to; a high-band element connected to the feeding element, the high-band element resonating with the signal in the first frequency band; a low-band element connected to the feeding element, the low-band element resonating with the signal in the second frequency band; an auxiliary element capacitively coupled to the low-band element at an open end of the low-band element; a ground member grounded; and a switch switching a conductive state and a non-conductive state between the ground member and the auxiliary element.

The present disclosure can provide an antenna device that corresponds to multiple bands and can achieve downsizing and wide band.

DETAILED DESCRIPTION

Figure 1:
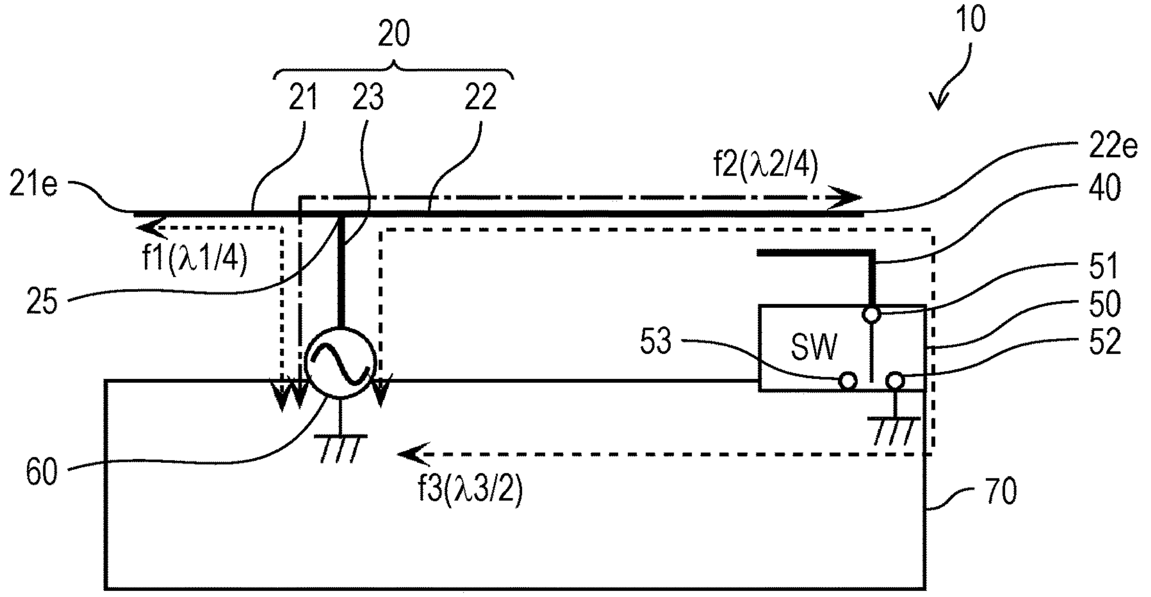
FIG. 1 is a schematic diagram illustrating an overall configuration of an antenna device according to a first exemplary embodiment.

Hereinafter, exemplary embodiments will be specifically described with reference to the drawings.

Note that the exemplary embodiments described below provide comprehensive or specific examples of the present disclosure. Numerical values, shapes, materials, components, arrangement positions and connection configurations of the components, steps, processing order of the steps, and the like shown in the following exemplary embodiments are just an example, and are not intended to limit the present disclosure.

Each of the drawings is a schematic diagram, and is not necessarily precisely illustrated. In the drawings, identical components are denoted by identical reference marks.

First Exemplary Embodiment

An antenna device according to a first exemplary embodiment will be described.

1-1. Overall Configuration

First, an overall configuration of the antenna device according to the first exemplary embodiment will be described with reference to FIG. 1. FIG. 1 is a schematic diagram illustrating the overall configuration of antenna device 10 according to the present exemplary embodiment. Antenna device 10 is an antenna that transmits and receives a signal in a first frequency band and a signal in a second frequency band. In the present exemplary embodiment, the second frequency band is a frequency band lower than the first frequency band. The first frequency band and the second frequency band are not particularly limited. In the present exemplary embodiment, the first frequency band is a band more than or equal to 1 GHz and less than or equal to 6 GHz, and the second frequency band is a band more than or equal to 0.5 GHz and less than 1.0 GHz.

As illustrated in FIG. 1, antenna device 10 includes antenna element 20, auxiliary element 40, switch 50, and ground member 70.

Antenna element 20 is a conductive element that transmits and receives a signal in the first frequency band and a signal in the second frequency band. Antenna element 20 has feeding element 23, high-band element 21, and low-band element 22. In the present exemplary embodiment, feeding element 23, high-band element 21, and low-band element 22 are connected at connection part 25. In addition, high-band element 21 and low-band element 22 extend from connection part 25 in directions opposite to each other. High-band element 21 and low-band element 22 are disposed on the same straight line such that their respective longitudinal directions coincide with each other.

An antenna including a combination of feeding element 23 and high-band element 21 functions as a monopole antenna corresponding to the first frequency band. Specifically, an electrical length of the antenna including feeding element 23 and high-band element 21 is about ¼ of a wavelength $\lambda 1$ corresponding to one frequency f1 included in the first frequency band. In addition, an antenna including a combination of feeding element 23 and low-band element 22 functions as a monopole antenna corresponding to the second frequency band lower than the first frequency band. Specifically, an electrical length of the antenna including feeding element 23 and low-band element 22 is about ¼ of a wavelength λ2 corresponding to one frequency f2 included in the second frequency band. Since the wavelength λ2 corresponding to the second frequency band is longer than the wavelength λ1 corresponding to the first frequency band, the electrical length of low-band element 22 is longer than the electrical length of high-band element 21.

Antenna element 20 is made by using a conductive material. Antenna element 20 is made by using, for example, a metal such as Cu, Al, or Au, an alloy containing a plurality of metals, or the like. Note that a shape of antenna element 20 is not particularly limited. Antenna element 20 may have, for example, a rod shape, a plate shape, a sheet shape, or the like. Alternatively, antenna element 20 may be made of a conductive pattern patterned on an insulating substrate. A method for manufacturing antenna element 20 is not particularly limited, and antenna element 20 may be made of a sheet metal, or may be made by plating, vapor deposition, laser direct structuring (LDS), or the like.

Feeding element 23 is a conductive element having feedpoint 60 to which the signal in the first frequency band and the signal in the second frequency band are supplied. Feeding element 23 is a portion of antenna element 20 that both the signal in the first frequency band and the signal in the second frequency band resonate with. Feedpoint 60 is disposed at one end of feeding element 23, and connection part 25 is disposed at the other end. To feedpoint 60, a signal is supplied via, for example, a coaxial cable, a feed pin, or the like. When a coaxial cable is used, an inner conductor of the coaxial cable is connected to feedpoint 60, and an outer conductor of the coaxial cable is connected to ground member 70. Note that a lumped-constant circuit may be connected to feedpoint 60 to adjust the impedance.

High-band element 21 is a conductive element that is connected to feeding element 23 and that a signal in the first frequency band resonates with. High-band element 21 is a portion of antenna element 20 that the signal in the first frequency band mainly resonates with. High-band element 21 has an elongated shape, whose one end is connected to connection part 25 and the other end is an open end 21*e*.

Low-band element 22 is a conductive element that is connected to feeding element 23 and that a signal in the second frequency band resonates with. Low-band element 22 is a portion of antenna element 20 that the signal in the second frequency band mainly resonates with. Low-band element 22 has an elongated shape, whose one end is connected to connection part 25 and the other end is an open end 22*e*.

Auxiliary element 40 is a conductive element that is disposed adjacent to low-band element 22 and is capacitively coupled to low-band element 22 at open end 22*e* of low-band element 22. One end of auxiliary element 40 is connected to input terminal 51 of switch 50. A coupling capacitance between auxiliary element 40 and low-band element 22 can be adjusted to a desired value by adjusting a distance between auxiliary element 40 and adjacent low-band element 22 and adjusting an adjacent length (that is, a length of a part of auxiliary element 40 adjacent to low-band element 22). A distance between auxiliary element 40 and low-band element 22 is less than 1/100 of a wavelength corresponding to the one frequency f2 included in the second frequency band. In the present exemplary embodiment, the distance between auxiliary element 40 and low-band element 22 is about 0.5 mm. An electrical length of auxiliary element 40 is less than ⅛ of the wavelength corresponding to the one frequency f2 included in the second frequency band. Auxiliary element 40 is made by using a conductive material. Auxiliary element 40 is made by using, for example, a metal such as Cu, Al, or Au, or an alloy containing a plurality of metals.

Ground member 70 is a conductive member that is grounded. Ground member 70 functions as a ground of antenna element 20. Ground member 70 is connected to output terminal 52 of switch 50. Ground member 70 is made by using a conductive material. Ground member 70 is made by using, for example, a metal such as Mg, Cu, Al, or Au, or an alloy containing a plurality of metals.

Switch 50 is an element that switches a conductive state and a non-conductive state between ground member 70 and auxiliary element 40. Switch 50 switches a conductive state and a non-conductive state between input terminal 51 and output terminal 52. Input terminal 51 is connected to auxiliary element 40, and output terminal 52 is connected to ground member 70. Switch 50 is not particularly limited as long as switch 50 is an element capable of switching the conductive state and the non-conductive state between ground member 70 and auxiliary element 40. As switch 50, a single-pole double-throw (SPDT) switch can be used, for example. In this case, as illustrated in FIG. 1, switch 50 has one input terminal 51 and two output terminals 52, 53. Output terminal 52 is connected to ground member 70, and output terminal 53 is opened. That is, when input terminal 51 and output terminal 52 of switch 50 are connected to each other, auxiliary element 40 and ground member 70 are brought into a conductive state, and when input terminal 51 and output terminal 53 are connected to each other, auxiliary element 40 and ground member 70 are brought into a non-conductive state.

Note that output terminals 52, 53 may be configured such that each of the output terminals 52, 53 is in a conductive state or a non-conductive state with ground member 70 through a desired impedance corresponding to a conductive state or a non-conductive state. For example, the impedance is configured with lumped elements such as an inductance (L) and a capacitance (C) suitable to adjust one frequency f3 included in the second frequency band. As switch 50, it is possible to use a switch having three or more throws (SP3T, SP4T, and the like) can be used. Switch 50 may have the following configuration. Switch 50 has three or more switching paths, and the switching path with which switch 50 is in the conductive state includes two or more paths having different impedances. Further, switch 50 may have the following configuration. Switch 50 has three or more switching paths, and the switching path with which switch 50 is in the non-conductive state includes two or more paths having different impedances. Switch 50 is supplied with a control signal for switching between the one frequency f2 and the one frequency f3 included in the second frequency band of the present antenna in accordance with a communication band (frequency) used for wireless communication, for example.

1-2. Action and Advantageous Effects

Figure 2:
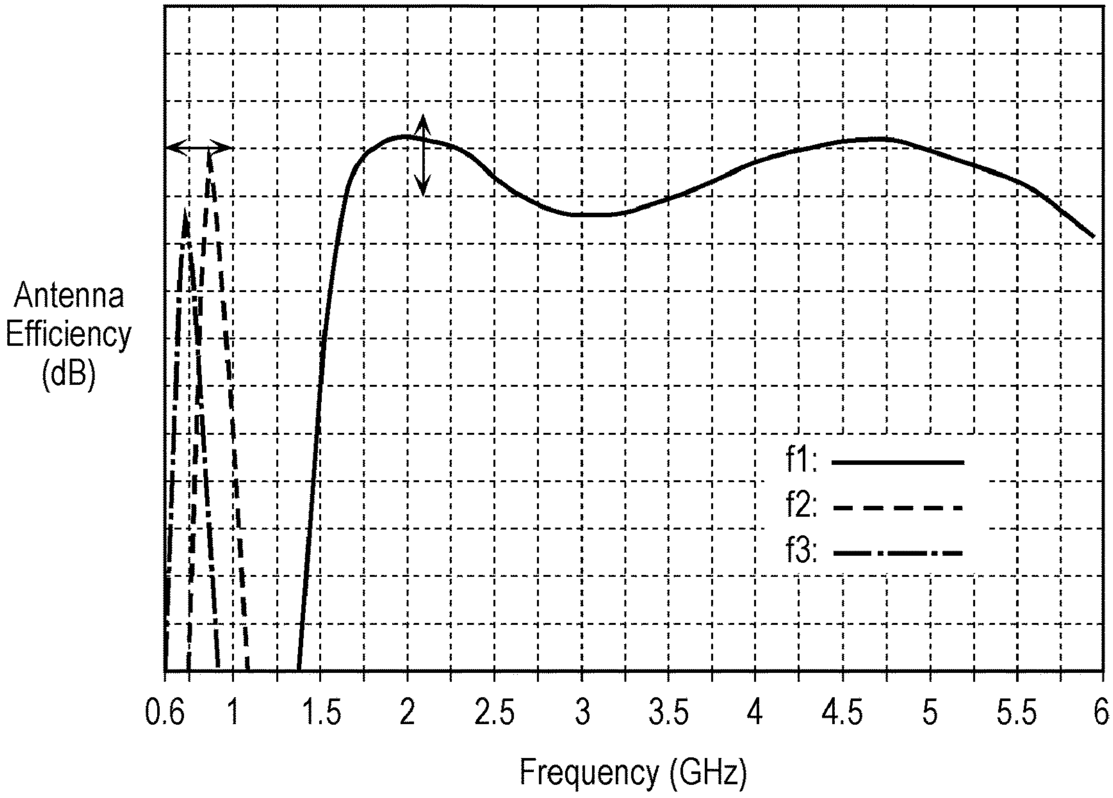
FIG. 2 is a graph illustrating a relationship between antenna efficiency and frequency of the antenna device according to the first exemplary embodiment.

Next, an action and advantageous effects of antenna device 10 according to the present exemplary embodiment will be described with reference to FIG. 2. FIG. 2 is a graph illustrating a relationship between antenna efficiency and frequency of antenna device 10 according to the present exemplary embodiment. The solid line, broken line, and dashed-dotted line in the graph of FIG. 2 respectively indicate the antenna efficiencies at the resonance frequencies f1, f2, f3.

As described above, in antenna device 10, there is formed a monopole antenna including feeding element 23 and high-band element 21 of antenna element 20 and corresponding to the first frequency band. Specifically, the electrical length of the monopole antenna including feeding element 23 and high-band element 21 is about ¼ of the wavelength λ1 corresponding to the one frequency f1 included in the first frequency band.

When switch 50 is in a non-conductive state, there is formed a monopole antenna including feeding element 23 and low-band element 22 and corresponding to the second frequency band. Specifically, the electrical length of the monopole antenna including feeding element 23 and low-band element 22 is about ¼ of the wavelength λ2 corresponding to the one frequency f2 included in the second frequency band. On the other hand, when switch 50 is in a conductive state, there is formed a loop antenna corresponding to the second frequency band and including feeding element 23, low-band element 22, auxiliary element 40, and ground member 70. At this time, an electrical length of the loop antenna including feeding element 23, low-band element 22, auxiliary element 40, switch 50, and ground member 70 is about ½ of a wavelength λ3 corresponding to the one frequency f3 included in the second frequency band. In addition, due to a capacitive coupling amount by auxiliary element 40 and an impedance amount by switch 50, the electrical length of the loop antenna can be adjusted without changing a size of the antenna.

As described above, antenna device 10 functions as a multi-band antenna that transmits and receives a signal in the first frequency band and a signal in the second frequency band. In addition, a resonance frequency band in the second frequency band of antenna device 10 can be widened as illustrated in FIG. 2, by differentiating the following two resonance frequencies from each other: the resonance frequency f2 of the monopole antenna that includes feeding element 23 and low-band element 22 and corresponds to the second frequency band; and the resonance frequency f3 of the loop antenna that includes feeding element 23, low-band element 22, auxiliary element 40, and ground member 70 and corresponds to the second frequency band.

Further, in the present exemplary embodiment, auxiliary element 40 does not have to be a passive element that can resonate as an antenna by itself as described in PTL 1, but only has to be an element that is adjacent to and capacitively coupled to low-band element 22. Therefore, the electrical length of auxiliary element 40 only has to be less than ⅛ of the wavelength corresponding to one frequency included in the second frequency band. Therefore, in the present exemplary embodiment, since auxiliary element 40 can be downsized, the antenna device can be smaller than in the case of using a passive element as the antenna device described in PTL 1.

Further, in the case of using a passive element, a frequency band that can be widened is limited to a narrow frequency band that the passive element can resonate with. On the other hand, in the present exemplary embodiment, since the loop antenna is formed to include a member such as ground member 70 that has a high degree of freedom in shape and dimension, it is possible to further widen a bandwidth as compared with the case of using a passive element.

Further, auxiliary element 40 is disposed adjacent to low-band element 22 and is capacitively coupled to low-band element 22 at open end 22*e* of low-band element 22. That is, auxiliary element 40 is capacitively coupled at a part of low-band element 22 that is most distant from high-band element 21. Therefore, influence of auxiliary element 40 on high-band element 21 can be reduced. That is, it is possible to reduce an influence on characteristics of high-band element 21 due to switching of the conductive state of switch 50. Specifically, it is possible to reduce a change, caused by switching of switch 50, in antenna efficiency at the resonance frequency f1 of antenna device 10 illustrated in FIG. 2. In the present exemplary embodiment, the distance between auxiliary element 40 and low-band element 22 is less than 1/100 of a wavelength corresponding to one frequency included in the second frequency band. This arrangement makes it possible to capacitively couple auxiliary element 40 and low-band element 22 to each other reliably. In addition, since the distance between auxiliary element 40 and low-band element 22 can be shortened, antenna device 10 can be further downsized.

Second Exemplary Embodiment

An antenna device according to a second exemplary embodiment will be described. The antenna device according to the present exemplary embodiment is different from antenna device 10 according to the first exemplary embodiment in that the antenna element constitutes a so-called inverted-F antenna. Hereinafter, the antenna device according to the present exemplary embodiment will be described mainly on differences from antenna device 10 according to the first exemplary embodiment.

2-1. Overall Configuration and Advantageous Effects

Figure 3:
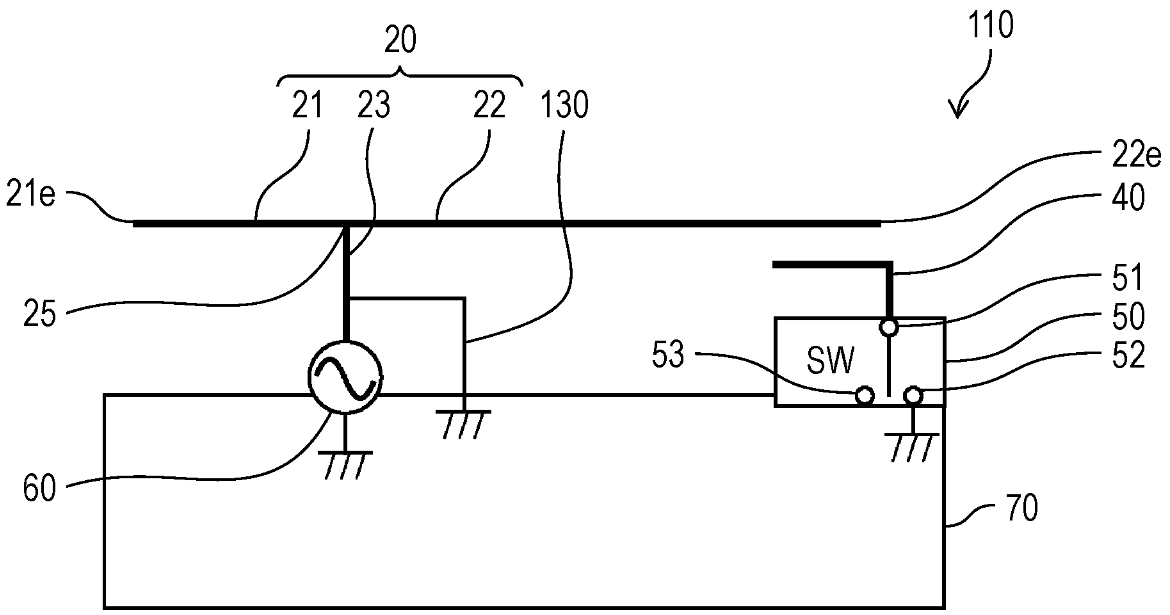
FIG. 3 is a schematic diagram illustrating an overall configuration of an antenna device according to a second exemplary embodiment.

An overall configuration and advantageous effects of the antenna device according to the present exemplary embodiment will be described with reference to FIG. 3. FIG. 3 is a schematic diagram illustrating an overall configuration of antenna device 110 according to the present exemplary embodiment. As illustrated in FIG. 3, antenna device 110 according to the present exemplary embodiment includes antenna element 20, auxiliary element 40, switch 50, and ground member 70, similarly to antenna device 10 according to the first exemplary embodiment. Antenna device 110 according to the present exemplary embodiment further includes short-circuit element 130.

Short-circuit element 130 is a conductive element that connects between ground member 70 and feeding element 23. Antenna element 20 and short-circuit element 130 constitute an inverted-F antenna. By configuring the inverted-F antenna as described above, a resonance frequency band in the second frequency band of the antenna device 110 can be widened.

2-2. Modified Examples

Figure 4:
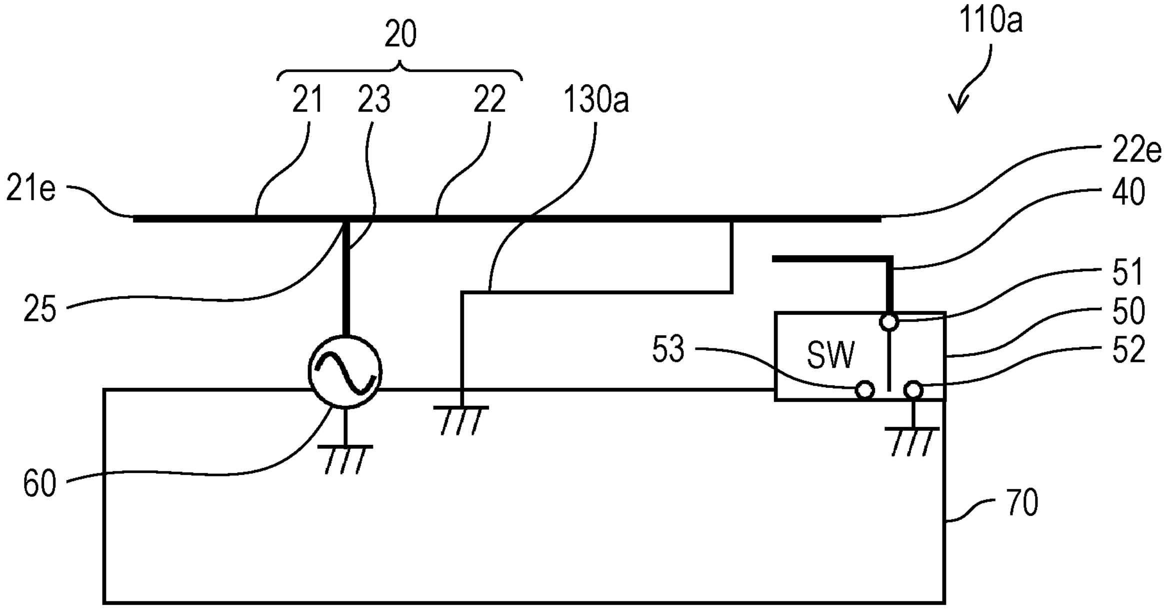
FIG. 4 is a schematic diagram illustrating an overall configuration of an antenna device according to a modified example of the second exemplary embodiment.

In antenna device 110 illustrated in FIG. 3, short-circuit element 130 connects ground member 70 and feeding element 23 to each other. However, short-circuit element 130 does not have to be connected to feeding element 23. Hereinafter, a modified example of an antenna device including a short-circuit element will be described with reference to FIG. 4. FIG. 4 is a schematic diagram illustrating an overall configuration of antenna device 110*a* according to a modified example according to the present exemplary embodiment.

As illustrated in FIG. 4, antenna device 110*a* according to the present modified example includes antenna element 20, auxiliary element 40, switch 50, ground member 70, and short-circuit element 130*a*, similarly to antenna device 110. Short-circuit element 130*a* according to the present modified example connect ground member 70 and low-band element 22 to each other. In addition, short-circuit element 130*a* is connected to low-band element 22 at a position closer to open end 22*e* than to a center of low-band element 22 in a longitudinal direction of low-band element 22. With this arrangement, feeding element 23, low-band element 22, and short-circuit element 130*a* constitute a folded antenna. This configuration makes it possible to further widen the resonance frequency band in the second frequency band of the antenna device 110*a*.

Third Exemplary Embodiment

An antenna device according to a third exemplary embodiment will be described.

The antenna device according to the present exemplary embodiment is different from antenna device 10 according to the first exemplary embodiment in a configuration of the ground member. Hereinafter, the antenna device according to the present exemplary embodiment will be described mainly on differences from antenna device 10 according to the first exemplary embodiment.

Figure 5:
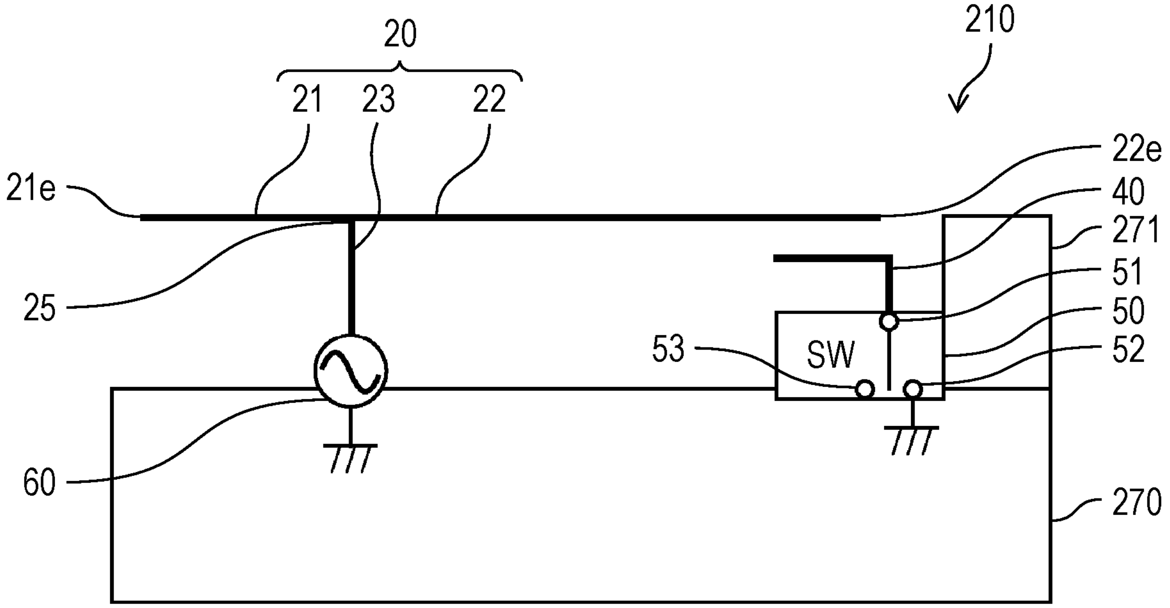
FIG. 5 is a schematic diagram illustrating an overall configuration of an antenna device according to a third exemplary embodiment.

An overall configuration of the antenna device according to the present exemplary embodiment will be described with reference to FIG. 5. FIG. 5 is a schematic diagram illustrating an overall configuration of antenna device 210 according to the present exemplary embodiment. As illustrated in FIG. 5, antenna device 210 according to the present exemplary embodiment includes antenna element 20, auxiliary element 40, switch 50, and ground member 270, similarly to antenna device 10 according to the first exemplary embodiment.

Ground member 270 according to the present exemplary embodiment includes coupling portion 271 disposed apart from open end 22*e* of low-band element 22 in the longitudinal direction of low-band element 22. Coupling portion 271 is disposed to face open end 22*e* of low-band element 22 in the longitudinal direction of low-band element 22. Auxiliary element 40 is disposed between open end 22*e* of low-band element 22 and coupling portion 271, and auxiliary element 40 is disposed adjacent to coupling portion 271 to be capacitively coupled to coupling portion 271. That is, auxiliary element 40 is capacitively coupled to both low-band element 22 and coupling portion 271. A distance between auxiliary element 40 and coupling portion 271 may be less than 1/100 of a wavelength corresponding to the one frequency f1 included in the first frequency band. This arrangement makes it possible to capacitively couple auxiliary element 40 and coupling portion 271 to each other reliably. By capacitively coupling auxiliary element 40 and coupling portion 271 to each other in this manner, harmonic components of low-band element 22 are propagated to coupling portion 271, which is a part of the ground member, via auxiliary element 40. That is, the harmonic components can be prevented from reaching switch 50 side connected to auxiliary element 40. Therefore, it is possible to largely reduce influence, caused by switching of the conductive state of switch 50, on the one frequency f1 included in the first frequency band.

Furthermore, in a case where auxiliary element 40 and coupling portion 271 are capacitively coupled to each other, the distance between auxiliary element 40 and coupling portion 271 can be shortened, so that antenna device 210 can be further downsized. In the present exemplary embodiment, the distance between auxiliary element 40 and coupling portion 271 is about 0.5 mm.

Fourth Exemplary Embodiment

An antenna device according to a fourth exemplary embodiment will be described. The antenna device according to the present exemplary embodiment is different from antenna device 210 according to the third exemplary embodiment in that the antenna element is formed on an insulating substrate. Hereinafter, the antenna device according to the present exemplary embodiment will be described mainly on differences from antenna device 210 according to the third exemplary embodiment.

4-1. Overall Configuration and Advantageous Effects

Figure 6:
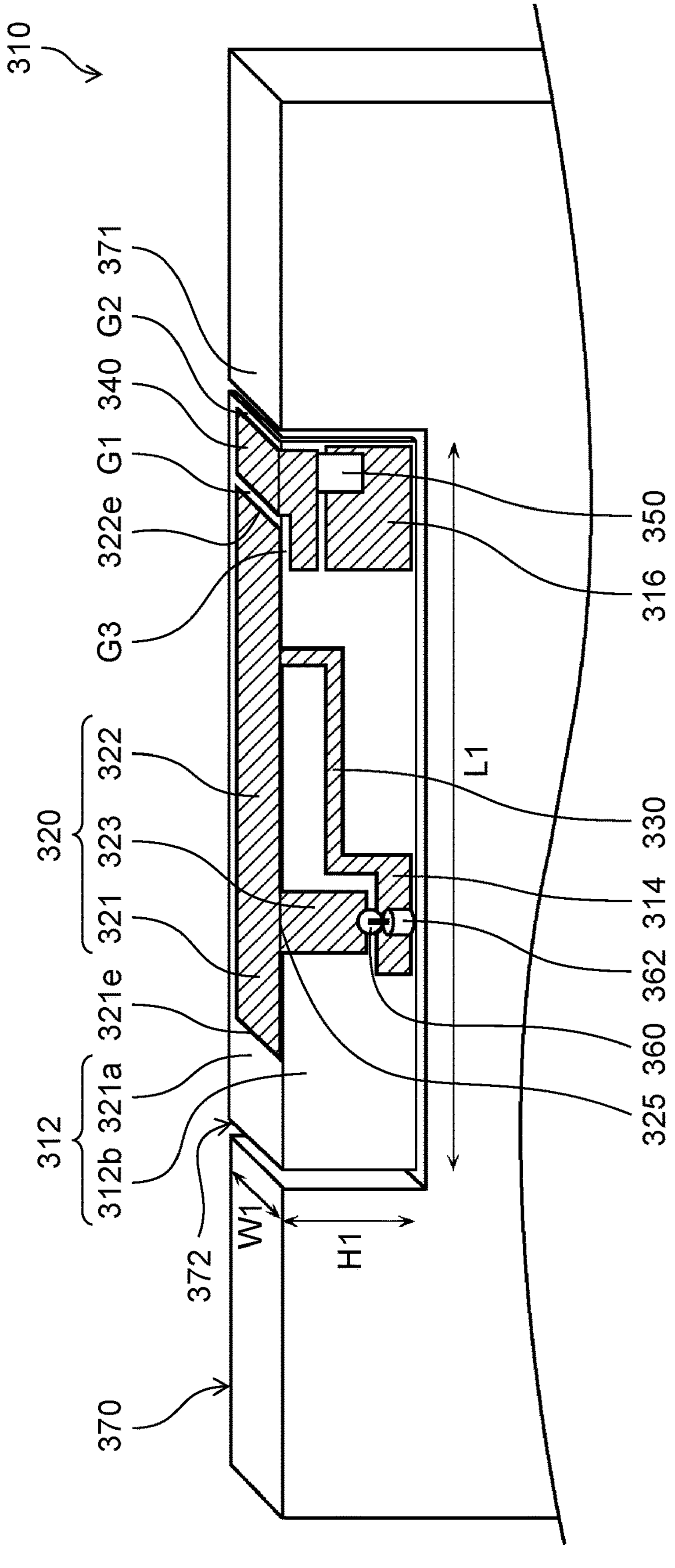
FIG. 6 is a schematic perspective view illustrating an overall configuration of an antenna device according to a fourth exemplary embodiment.

First, an overall configuration and advantageous effects of the antenna device according to the present exemplary embodiment will be described with reference to FIG. 6. FIG. 6 is a schematic perspective view illustrating an overall configuration of antenna device 310 according to the present exemplary embodiment. As illustrated in FIG. 6, antenna device 310 according to the present exemplary embodiment includes antenna element 320, auxiliary element 340, switch 350, and ground member 370, similarly to antenna device 210 according to the third exemplary embodiment. Antenna device 310 according to the present exemplary embodiment further includes short-circuit element 330, ground elements 314, 316, and insulating substrate 312.

Ground member 370 according to the present exemplary embodiment has a rectangular parallelepiped outer shape. As the ground member, a metal housing for a mobile terminal or the like can be used, for example. Ground member 370 has recess 372. Ground member 370 includes a coupling portion 371, and coupling portion 371 includes at least a part of an inner surface of recess 372.

Insulating substrate 312 is an insulating substrate on which switch 350 is mounted. Antenna element 320 and auxiliary element 340 are disposed on insulating substrate 312. In the present exemplary embodiment, on insulating substrate 312 there are disposed ground elements 314, 316 and short-circuit element 330. As insulating substrate 312, a printed circuit board or the like can be used, for example. As described above, since antenna device 310 includes insulating substrate 312, antenna element 320 and the like having an arbitrary shape can be easily formed on insulating substrate 312 by patterning a conductive pattern.

In the present exemplary embodiment, insulating substrate 312 is a flexible substrate. Therefore, a shape of insulating substrate 312 can be deformed in accordance with shapes of ground member 370 and the like. Insulating substrate 312 includes first portion 312*a* having a width W1 in the thickness direction of ground member 370, and second portion 312*b* having a height H1 and bent substantially perpendicularly to first portion 312*a*. The width W1 of first portion 312*a* of insulating substrate 312 and the height H1 of second portion 312*b* are approximately the same, and a length L1 of insulating substrate 312 (a dimension in a direction perpendicular to a direction of the width W1 and a direction of the height H1) is about five times the width W1 and the height H1.

Insulating substrate 312 is fixed to ground member 370. Insulating substrate 312 is disposed in recess 372 of ground member 370. Since this arrangement makes it possible to prevent insulating substrate 312 from protruding from ground member 370, ground member 370 can surround insulating substrate 312 and at least a part of the elements disposed on insulating substrate 312. Therefore, by making ground member 370 have a robust structure, robust antenna device 310 can be achieved. In addition, by disposing insulating substrate 312 in recess 372, part of recess 372 facing auxiliary element 340 can be used as coupling portion 371.

Insulating substrate 312 may be fixed with a conductive screw or the like that electrically connects ground member 370 and ground elements 314, 316 formed on insulating substrate 312 to each other.

Antenna element 320 according to the present exemplary embodiment is a conductive pattern disposed on insulating substrate 312. Antenna element 320 has feeding element 323, high-band element 321, and low-band element 322. In the present exemplary embodiment, feeding element 323 is disposed on second portion 312*b* of insulating substrate 312, and high-band element 321 and low-band element 322 are disposed on first portion 312*a* of insulating substrate 312. As described above, antenna element 320 does not have to be disposed on the same plane, and may be disposed on a plurality of planes that are not parallel to each other.

Feeding element 323 has feedpoint 360. Feeding element 323 is a conductive pattern having a rectangular shape. Since feeding element 323 has a width in a direction perpendicular to a resonance direction of a signal as described above, the resonance frequency band can be widened. To feedpoint 360, there is connected an inner conductor of coaxial cable 362 that transmits a signal in the first frequency band and a signal in the second frequency band.

High-band element 321 is a conductive pattern having a rectangular shape with a width of about W1. Since high-band element 321 has a width in the direction perpendicular to the resonance direction of a signal as described above, a resonance frequency band in the first frequency band can be widened. One end of high-band element 321 is connected to connection part 325, and the other end is open end 321*e*.

Low-band element 322 is a conductive pattern having a rectangular shape with a width of about W1, and is disposed on first portion 312*a* of insulating substrate 312. Since low-band element 322 has a width in a direction perpendicular to the resonance direction of a signal as described above, the resonance frequency band can be widened. One end of low-band element 322 is connected to connection part 325, and the other end is open end 322*e*.

Auxiliary element 340 is a conductive pattern provided on insulating substrate 312. Auxiliary element 340 is capacitively coupled to at least part of open end 322*e* of low-band element 322. In the present exemplary embodiment, as illustrated in FIG. 6, auxiliary element 340 has a portion disposed on first portion 312*a* of insulating substrate 312 and a portion disposed on second portion 312*b*. The portion of auxiliary element 340 disposed on first portion 312*a* is capacitively coupled to open end 322*e* of low-band element 322 via gap G1. Further, the portion of auxiliary element 340 disposed on second portion 312*b* is capacitively coupled to an end edge connecting to open end 322*e* of low-band element 322 via gap G3. Since, as described above, auxiliary element 340 is capacitively coupled not only to open end 322*e* of low-band element 322 but also to the end edge connecting to open end 322*e*, the capacitive coupling can be established more reliably.

Auxiliary element 340 is capacitively coupled to coupling portion 371 of ground member 370 via gap G2. In the present exemplary embodiment, a distance between auxiliary element 340 and coupling portion 371 of ground member 370 is about 0.5 mm.

Ground element 314 is a conductive element that is made of a conductive pattern disposed on insulating substrate 312 and is connected to ground member 370. Ground element 314 is disposed at a position, on second portion 312*b* of insulating substrate 312, facing feedpoint 360 of feeding element 323, and is connected to an outer conductor of coaxial cable 362. It is not particularly limited how to connect ground element 314 and ground member 370 to each other. For example, ground element 314 may be connected to ground member 370 with a conductive screw or the like. Further, the screw may be used to fix insulating substrate 312 to ground member 370. Alternatively, ground element 314 may be connected to ground member 370 with a conductive tape or the like.

Ground element 316 is a conductive element that is formed of a conductive pattern disposed on insulating substrate 312, is connected to switch 350, and is connected to ground member 370 to be grounded. Ground element 316 is disposed at a position, on second portion 312*b* of insulating substrate 312, facing auxiliary element 340. In the present exemplary embodiment, an area occupied by ground element 316 on insulating substrate 312 is larger than an area occupied by auxiliary element 340 on insulating substrate 312. This configuration makes it possible to stably maintain a potential of ground element 316, and when ground element 316 and auxiliary element 340 are electrically connected to each other by switch 350, a potential of auxiliary element 340 can be stably maintained at a ground potential. Similarly to the connection form between ground element 314 and ground member 370, it is not particularly limited how to connect ground element 316 and ground member 370 to each other.

Switch 350 is an element that switches a conductive state and a non-conductive state between ground member 370 and auxiliary element 340. In the present exemplary embodiment, switch 350 is mounted on insulating substrate 312, and is connected to ground member 370 via ground element 316. Switch 350 is directly connected to ground element 316 and auxiliary element 340. This arrangement can reduce to the minimum an electrical length between auxiliary element 340 and ground element 316; therefore, when switch 350 is brought into the conductive state, the potential of auxiliary element 340 can be stably maintained at the ground potential.

In the present exemplary embodiment, switch 350 is controlled by a control signal. The control signal for controlling switch 350 is input from an outside of insulating substrate 312. As a result, a control circuit or the like that outputs a control signal can be disposed outside insulating substrate 312. For example, the control signal may be output from a communication module or the like for generating a signal in the first frequency band and a signal in the second frequency band that are input to feedpoint 360. For example, the communication module may output to switch 350 a control signal corresponding to a frequency band to be used. Further, the communication module may be disposed on ground member 370.

Switch 350 may be covered with resin. For example, switch 350 may be covered with insulating substrate 312 and a potting resin, and liquid-tight sealing may be provided between the potting resin and insulating substrate 312. This can make switch 350 waterproof. In particular, when ground member 370 forms a chassis of a waterproof terminal, switch 350 is disposed outside the waterproof terminal;

therefore, water could get into switch 350. Even in such a case, when switch 350 is covered with resin, switch 350 can be waterproof.

Short-circuit element 330 connects ground member 370 and low-band element 322 to each other. In the present exemplary embodiment, short-circuit element 330 is disposed on second portion 312*b* of insulating substrate 312, and is connected to ground member 370 via ground element 314.

4-2. Application Examples

Figure 7:
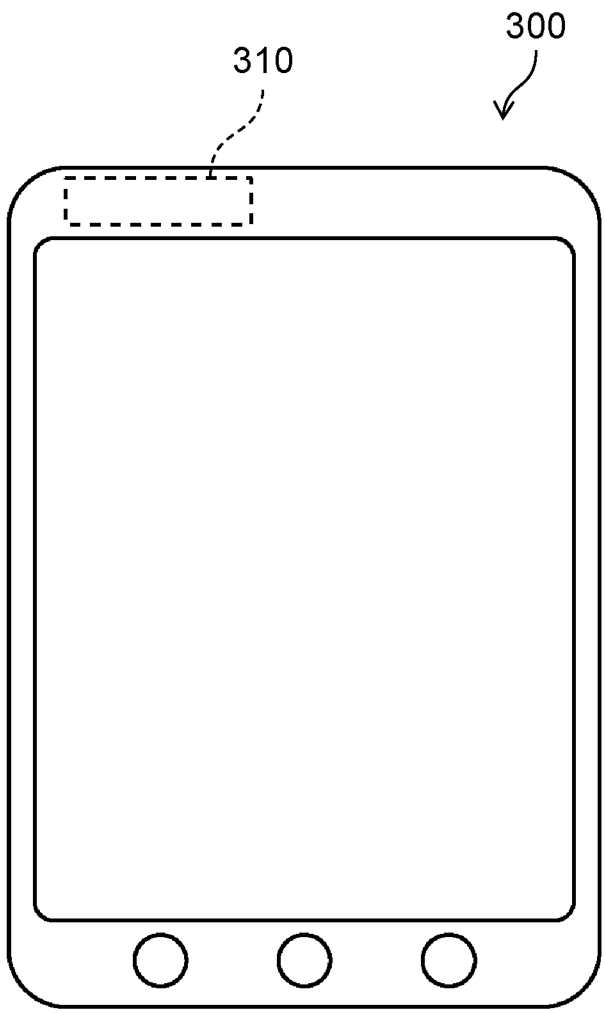
FIG. 7 is a schematic diagram illustrating an application example of the antenna device according to the fourth exemplary embodiment to a tablet terminal.
Figure 8:
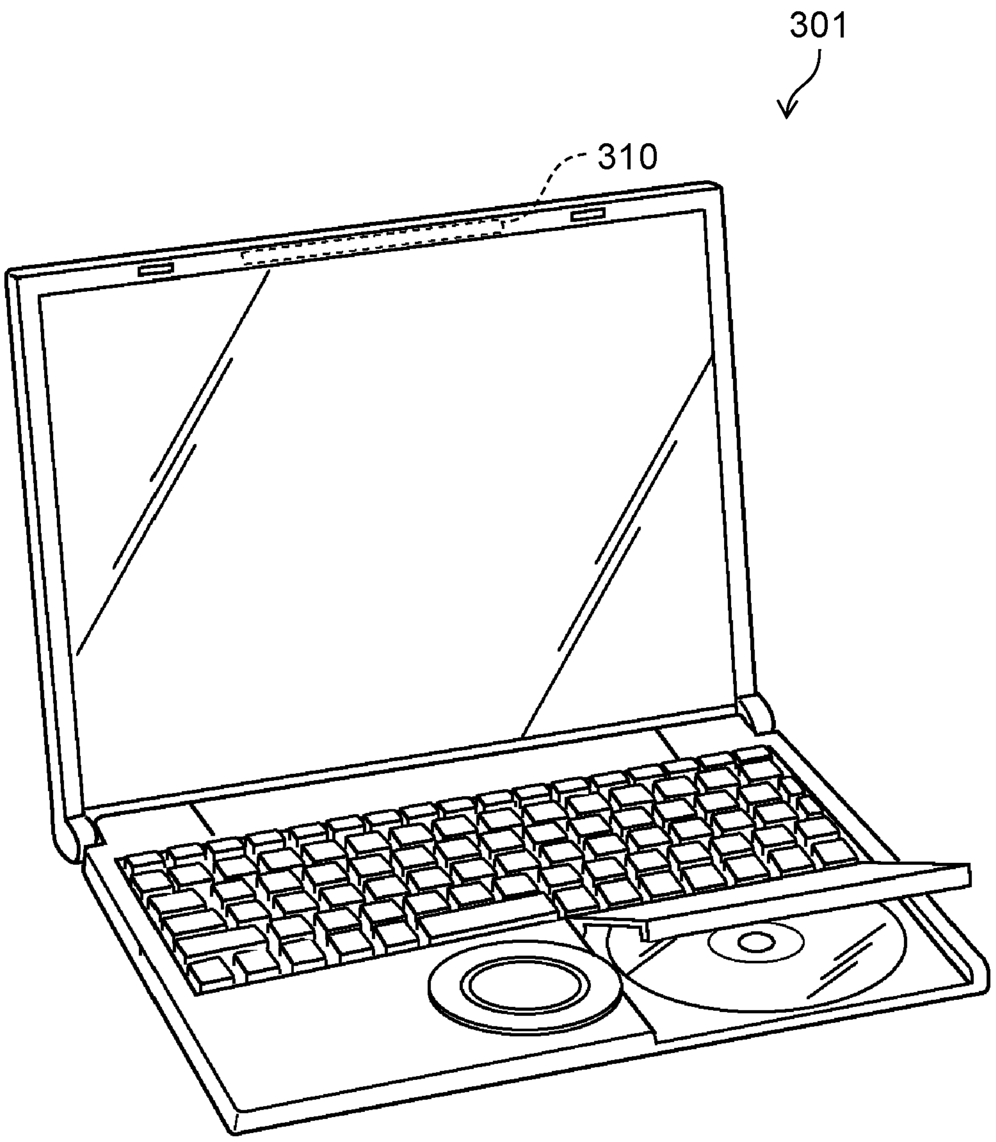
FIG. 8 is a schematic diagram illustrating an application example of the antenna device according to the fourth exemplary embodiment to a laptop computer.

Next, application examples of antenna device 310 according to the present exemplary embodiment will be described with reference to FIGS. 7 and 8. FIGS. 7 and 8 are respectively schematic diagrams illustrating application examples of antenna device 310 according to the present exemplary embodiment to tablet terminal 300 and laptop computer 301.

As illustrated in FIGS. 7 and 8, antenna device 310 according to the present exemplary embodiment can be applied to tablet terminal 300, laptop computer 301, and the like.

As illustrated in FIG. 7, antenna device 310 is disposed inside tablet terminal 300. It is not particularly limited where to dispose antenna device 310 in tablet terminal 300, and antenna device 310 may be disposed in a bezel portion of tablet terminal 300 as illustrated in FIG. 7.

As illustrated in FIG. 8, antenna device 310 is disposed inside laptop computer 301. It is not particularly limited where to dispose antenna device 310 in laptop computer 301, and antenna device 310 may be disposed in a bezel portion of a display of laptop computer 301 as illustrated in FIG. 8.

As ground member 370 of antenna device 310, it is possible to use a metal chassis of tablet terminal 300 or laptop computer 301, for example.

MODIFIED EXAMPLES AND OTHERS

The present disclosure has been described above on the basis of the exemplary embodiments. However, the present disclosure is not limited to the above exemplary embodiments. Various modifications made on the above exemplary embodiments by those skilled in the art may be included in the present disclosure without departing from the scope of the present disclosure.

For example, a meander structure that reduces propagation of a signal in the second frequency band may be used for part of the high-band element of the antenna device according to each of the above exemplary embodiments. As a result, it is possible to reduce influence of the high-band element on the signal in the second frequency band.

In addition, the shapes of the antenna elements included in the antenna devices according to the above exemplary embodiments are not limited to the shapes illustrated as examples in respective ones of the above exemplary embodiments. Each of the feeding element, the high-band element, and the low-band element of the antenna element may have an elliptical shape or the like, or may be curved.

In addition, a form realized by arbitrarily combining components and functions in the exemplary embodiments without departing from the gist of the present disclosure is also included in the present disclosure.

For example, antenna device 210 according to the third exemplary embodiment may further include short-circuit element 130 or short-circuit element 130*a* according to the second exemplary embodiment, and antenna device 310 according to the fourth exemplary embodiment may include short-circuit element 130 according to the second exemplary embodiment instead of short-circuit element 330. Further, antenna device 310 according to the fourth exemplary embodiment may not include short-circuit element 330 or the like.

The multi-band antenna of the present disclosure can be used, for example, as a part of an array antenna for a wireless module used in an acoustic device or the like.

What is claimed is:

1. An antenna device comprising:

a feeding element having a feedpoint that a signal in a first frequency band and a signal in a second frequency band lower than the first frequency band are supplied to;

a high-band element connected to the feeding element, the high-band element resonating with the signal in the first frequency band;

a low-band element connected to the feeding element, the low-band element resonating with the signal in the second frequency band;

an auxiliary element capacitively coupled to the low-band element at an open end intersecting a longitudinal direction of the low-band element;

a ground member grounded; and a switch switching a conductive state and a non-conductive state between the ground member and the auxiliary element wherein the ground member includes a coupling portion disposed apart from the open end of the low-band element in a longitudinal direction of the low-band element, the auxiliary element is disposed between the open end of the low-band element and the coupling portion, and the auxiliary element is capacitively coupled to the coupling portion.

2. The antenna device according to claim 1, wherein when the switch is in the non-conductive state, a monopole antenna is formed to include the feeding element and the low-band element, and when the switch is in the conductive state, a loop antenna is formed to include the feeding element, the low-band element, the auxiliary element, and the ground member.

3. The antenna device according to claim 1, wherein the switch includes three or more switching paths, and when the switch is in the conductive state, two or more switching paths among the three or more switching paths have different impedances.

4. The antenna device according to claim 1, wherein the auxiliary element has an electrical length less than $1/8$ of a wavelength corresponding to one frequency included in the second frequency band.

5. The antenna device according to claim 1, wherein a distance between the auxiliary element and the low-band element is less than $1/100$ of a wavelength corresponding 5 to one frequency included in the second frequency band.

6. The antenna device according to claim 1, wherein a distance between the auxiliary element and the coupling portion is less than $1/100$ of a wavelength corresponding to one frequency included in the first frequency band.

7. The antenna device according to claim 1, further comprising a short-circuit element connecting the ground member and the feeding element or the low-band element to each other.

8. The antenna device according to claim 1, further comprising an insulating substrate that the switch is mounted on, wherein the feeding element, the high-band element, the low-band element, and the auxiliary element each include a conductive pattern provided on the insulating substrate, and the insulating substrate is fixed to the ground member.

9. The antenna device according to claim 8, further comprising a ground element including a conductive pattern disposed on the insulating substrate, wherein the ground element is connected to the switch and is connected to the ground member.

10. The antenna device according to claim 8, wherein the ground member has a recess, and the insulating substrate is disposed in the recess.

11. The antenna device according to claim 8, wherein the switch is covered with resin.

12. The antenna device according to claim 8, wherein a control signal for controlling the switch is input from an outside of the insulating substrate.

13. The antenna device according to claim 8, wherein the insulating substrate is a flexible substrate.

* * * * *